United States Patent [19]
Wheeler

[11] 3,976,836
[45] Aug. 24, 1976

[54] AUTOMATIC BLACK LEVEL SETTING CIRCUIT

[75] Inventor: Robert Charles Wheeler, Elba, N.Y.

[73] Assignee: GTE Sylvania Incorporated, Stamford, Conn.

[22] Filed: June 9, 1975

[21] Appl. No.: 585,396

[52] U.S. Cl. .................... 178/7.3 DC; 178/DIG. 26
[51] Int. Cl.² ......................................... H04N 5/16
[58] Field of Search................ 178/7.3 DC, 7.5 DC, 178/DIG. 26; 358/34

[56] References Cited
UNITED STATES PATENTS
3,207,998  9/1965  Corney et al............ 178/7.3 DC X Primary Examiner—Benedict V. Safourek
Assistant Examiner—Aristotelis M. Psitos
Attorney, Agent, or Firm—Norman J. O'Malley; Thomas H. Buffton; Robert T. Orner

[57] ABSTRACT

A circuit for automatically setting the black level in a television receiver includes a comparator circuit coupled to a source of video signals, an adjustable DC potential, and a disabling potential and providing a control signal representative of a video information signal and vertical blanking signal in excess of a threshold level with a detector and limiter providing a DC potential derived from the control signal for setting the black level of a signal available at the video signal source.

20 Claims, 2 Drawing Figures

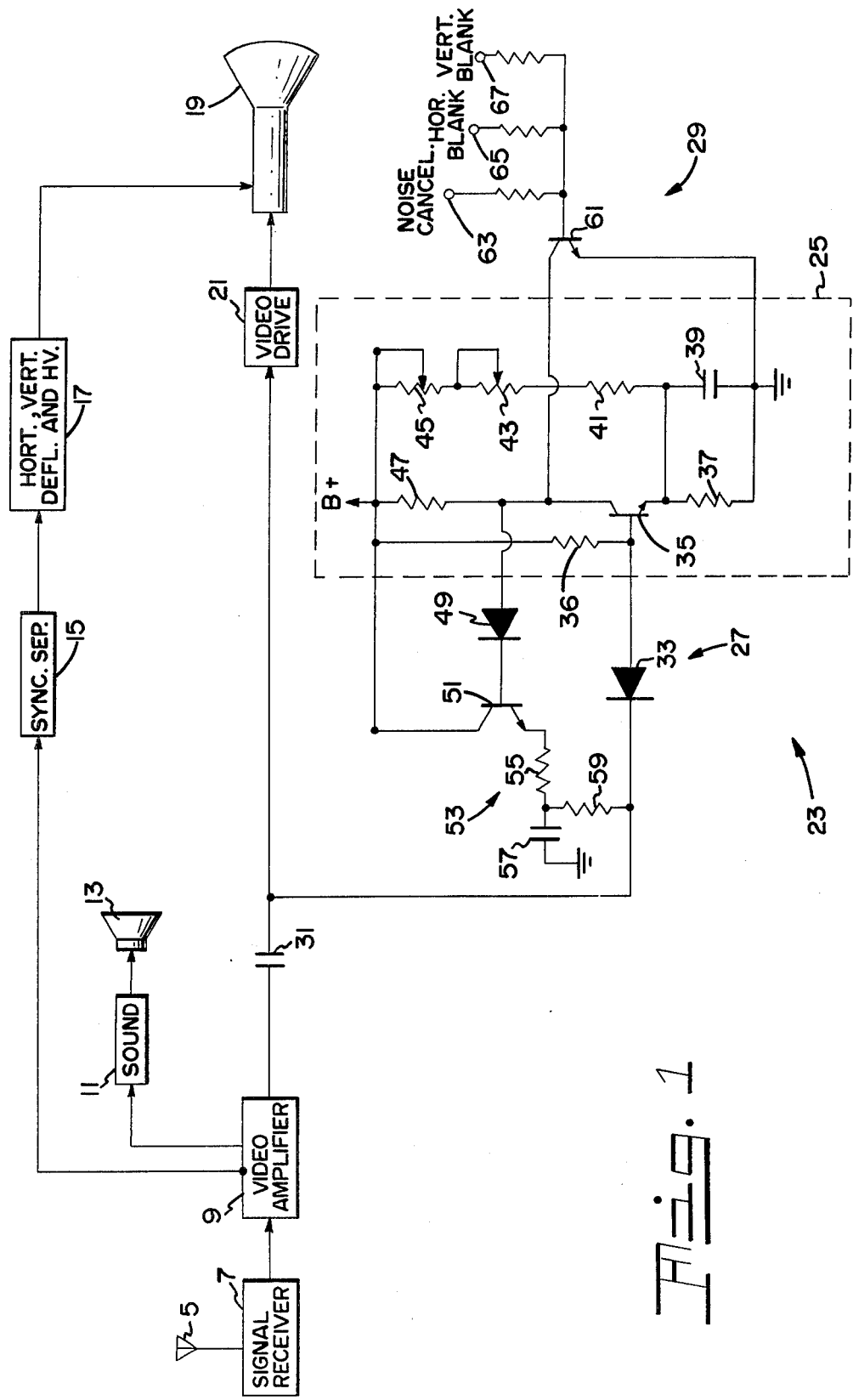

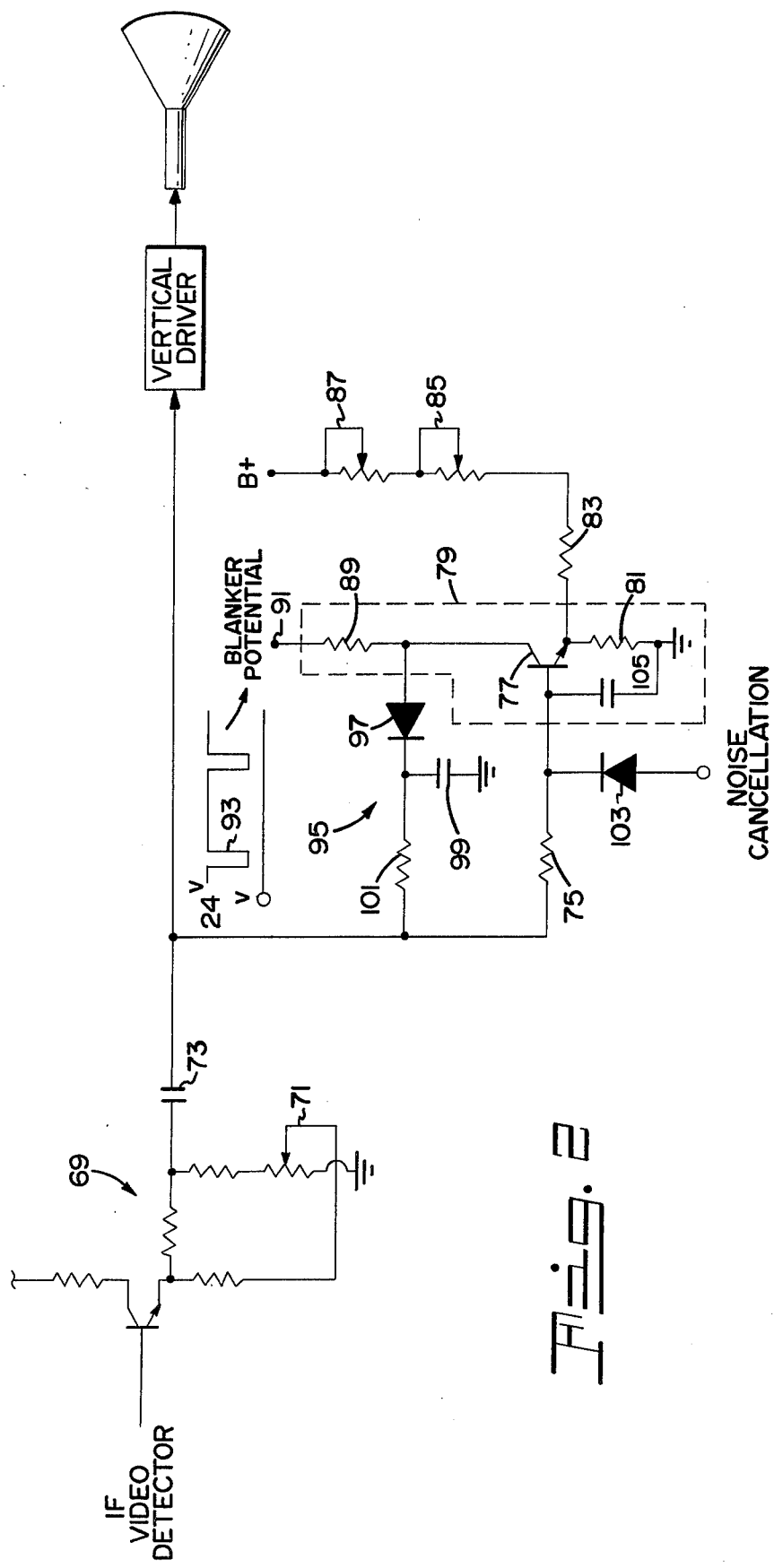

AUTOMATIC BLACK LEVEL SETTING CIRCUIT

CROSS REFERENCE TO OTHER APPLICATIONS

A co-pending application bearing Ser. No. 446,396, entitled Automatic Video Signal Control Circuit, filed Feb. 27, 1974 and assigned to the Assignee of the present application relates to circuitry wherein cancellation of the horizontal and vertical blanking portions of the video signal are effected and black level is derived from the peak black level in the video information portion of the signal. Co-pending application bearing Ser. No. 446,397 entitled "Peak Detector and Sample and Hold Circuit" filed Feb. 27, 1974 and assigned to the Assignee of the present application relates to circuitry for rapidly altering the output of a peak detecting means in response to rapid alterations of the applied signal. A co-pending application bearing Ser. No. 446,496 entitled "Pulse Width Control and Advancing Circuit" filed Feb. 27, 1974 and assigned to the Assignee of the present application relates to circuitry for developing pulse signals of greater width than the horizontal pulse signals advanced in time with respect to and wider than the vertical pulse signal portion of a composite video signal.

BACKGROUND OF THE INVENTION

In a television receiver a number of techniques have been employed for transmitting the DC component of a detected video signal to the cathode ray tube (CRT) or image reproducer for establishing a black reference level. Among the alternatives available are such well known techniques as AC coupling, full DC coupling, partial DC coupling, clamping to the tip of the sync pulse signal (DC restoration) and clamping to the back porch of the horizontal blanking interval (DC restoration).

Generally, each of the above-mentioned alternatives has advantages and disadvantages. For example, AC coupling in any amount is accompanied by undesired shifting of the black reference level due to the varying amount of black in the scene or the average picture level. DC coupling is prone to undesired drifting in various stages of the amplification network. Sync tip clamping and back porch clamping as well as DC coupling cause a shift in black level due to variations in sync amplitude from station to station as well as errors in station set-up of the signals. Moreover, clamping techniques are especially susceptible to "setting-up" on undesired noise signals and require special noise immunity circuits.

In a more recent approach, the blackest video information of a viewed scene is utilized to provide the black level setting for a cathode ray tube of the television receiver. Therein, the blackest information of the "picture" portion of the video signal is used to determine the black level setting. Also, the horizontal and vertical blanking pulse signals are removed from the video signal as set forth in the above-mentioned co-pending applications. Thus, if the blackest video information in a viewed scene is held or adjusted automatically to be black, then the black level must be independent of sync pulse amplitude, back porch level, or station "set-up" levels of the remainder of the video signal.

Although the above-described technique of employing the blackest portion of the video information signal to provide a black level setting has been and still is utilized in numerous commercial television receivers, it has been found that there still remains something to be desired. Specifically, the above circuitry utilizes a sensitive peak detector system which is sensitive to noise signals. Thus, very good noise protection circuitry is required to prevent "backing off" of the signal due to random noise pulses. Also, extensive circuitry is required to insure the total elimination of the horizontal and vertical blanking pulse signals in order to prevent the sensitive peak detector from clamping thereto and ignoring the black portion of the picture information signal. Thus, extensive and expensive circuitry is undesirably required for such systems.

OBJECTS AND SUMMARY OF THE INVENTION

An object of the present invention is to enhance the image reproductive capabilities of a television receiver. Another object of the invention is to improve the black level setting of a television receiver. Still another object of the invention is to simplify the circuitry required for utilizing the blackest portion of the video information of a received video signal to provide a black level setting. A further object of the invention is to provide circuitry for utilizing the vertical pulse signal portion and video information portion of a video signal for establishing a detected and limited black level setting in a television receiver.

These and other objects, advantages and capabilities are achieved in one aspect of the invention by an automatic black level setting circuit having a comparator circuit means providing a control signal in response to video information signals in excess of a given threshold and a detector and limiter means responsive to the control signal for providing a DC potential to establish a black level setting representative of the blackest portion of a viewed scene or of the video information portion of the video signal.

BRIEF DESCRIPTION OF THE DRAWINGS

FIG. 1 is an explanatory diagram, in block and schematic form, of an automatic black level setting circuit for a television receiver; and FIG. 2 is a block and schematic diagram of a preferred embodiment of an automatic black level setting circuit for a television receiver.

DESCRIPTION OF THE PREFERRED EMBODIMENT

For a better understanding of the present invention, together with other and further objects, advantages and capabilities thereof, reference is made to the following disclosure and appended claims in conjunction with the accompanying drawings.

Referring to the block and schematic illustration of FIG. 1, a television receiver includes the usual antenna 5 coupled to a signal receiver 7. The signal receiver has RF, IF, detector, and mixer stages and provides a video signal which is applied to a video amplifier stage 9.

The video amplifier stage 9 or source of video signal is coupled to a sound channel 11 connected to a loudspeaker 13. Another output from the video amplifier stage 9 is applied to a sync separator stage 15 which is, in turn, coupled to horizontal and vertical deflection and high voltage circuitry 17. The output from the deflection and high voltage circuitry 17 is applied to a cathode ray tube (CRT) 19. Still another output of the video amplifier stage or video signal source 9 is applied to a video driver stage 21 coupled to the cathode ray tube 19.

Further, an output of the video signal source 9 is applied to an automatic black level setting circuit 23. This automatic black level setting circuit 23 includes a comparator circuit means 25 coupled to a detector and limiter means 27 which is, in turn, coupled back to the video signal source 9. Also, a source of disablement potentials 29 is coupled to the comparator circuit means 25.

More specifically, a source of video signals 9 is AC coupled by a capacitor 31 to a diode 33 connected to a first input electrode or base of a transistor 35 of the comparator circuit means 25. The base of the transistor 35 is also coupled by a resistor 36 to the potential source B+. The emitter or second input electrode of the transistor 35 is connected to circuit ground by a resistor 37 which may be shunted by a by-pass capacitor 39. The second input electrode of the transistor 35 is also connected to a potential source B+ by way of a series connected fixed resistor 41 and a pair of adjustable resistors, 43 and 45 respectively, and often referred to as brightness range and black level setting controls.

The output electrode or collector of the transistor 35 is coupled by a load resistor 47 to the potential source B+. Also, the collector of the transistor 35 is connected to a diode 49 coupled to the base of a transistor 51 of the detector and limiter means 27. The collector of the transistor 51 is connected to the potential source B+. The emitter of the transistor 51 is coupled to a time constant circuit 53 including a resistor 55 coupled to a charge capacitor 57 connected to circuit ground. A resistor 59 couples the output of the detector and limiter means 27 available at the time constant circuit 53 back to the source of video signals 9.

Further, the source of disablement potentials 29 includes a transistor 61 with a base electrode coupled to a source of noise cancellation signals 63, a source of horizontal blanking pulse signals 65, and, optionally, a source of vertical blanking pulse signal 67 derived from circuitry of the television receiver. The emitter of the transistor 61 is connected to circuit ground while the collector is connected to the output electrode or collector of the transistor 35 of the comparator circuit means 25.

As to operation, it may be generally stated that the transistor 35 of the comparator circuit means 25 is normally biased to a conductive or saturated condition while the transistor 61 of the source of disablement potentials 29 is normally biased to a non-conductive state. Also, a threshold potential level, provided by the adjustable resistors 43 and 45 and the DC potential source B+, appears at the emitter electrode of the transistor 35.

A negative sync polarity video signal available from the source of video signals 9 which is in excess of or in this case more negative than the above-mentioned threshold level of the transistor 35 renders the transistor 35 non-conductive to provide a control signal at the output electrode thereof. Moreover, the control signal is in the form of signal peaks or an amplified version of the video signal in excess of or more negative than the threshold level. This control signal is detected by the detector and limiter means 27 to provide a DC potential which is fed back and establishes a black level setting which is proportional to the threshold level setting of the transistor 35 and dependent upon the black content of the signal available from the video signal source 9. Also, noise or any portion of the video signal such as the horizontal or vertical blanking pulse signals may be rendered ineffective by causing conductivity of the transistor 61 of the source of disablement potential 29. Thereupon, the transistor 35 is disabled and the control signal is no longer effective for the particular blanked portion of the signal.

More specifically, a negative polarity "black" video signal available at the source of video signals 9 will forward bias the isolation diode 33 to cause conduction thereof whereupon the signal will begin to "turn off" the transistor 35. As the transistor 35 is "turned off", positive-going amplified signal peaks appear at the output or collector electrode which are developed from the "blackest" portion of the video signal.

At the same time, the transistor 61 of the source of disablement potentials 29 is normally non-conductive until it is turned on and saturated by noise signals or horizontal or vertical blanking pulse signals fed to the base thereof. Thus, if the transistor 61 is turned on during noise or horizontal or vertical blanking intervals of the video signal, the comparator circuit means 25 will be disabled and the detector and limiter means 27 will only respond to signals during the picture or video information signal portion of the video signal.

Returning to the positive-going amplified signal pulses or the control signal appearing at the output of the transistor 35, this control signal is detected by the detector and limiter means 27 with the diode 49 serving to inhibit "zenering" or reverse conduction of the transistor 51 and the transistor 51 also providing rectification and current gain. The detector develops a DC voltage at the charge capacitor 57 which is fed back, via the resistor 59, to the video signal source 9 and raises the DC voltage level in a direction to prevent the negative black signal information from which it was developed from going more negative. Moreover, if the signal available at the video signal source 9 has insufficient negative voltage to turn off the transistor 35, the voltage will decay until some portion of the signal is sufficiently negative to turn off the transistor 35.

At this point it should be noted that the detector and limiter means 27 does not function as a peak detector in this application. Rather, the detector tends toward an averaging characteristic rather than a peak characteristic as the value of the resistor 55 is increased. Thus, an increase in ohmic value of the resistor 55 lengthens the charge time constant of the circuit 53 such that the short duration pulse potentials derived from the picture information signal below the threshold level of the transistor 35 cannot charge the capacitor 57 to a peak value.

Since complete blanking of the vertical pulse signals is difficult and expensive, it is desirable to eliminate this requirement. Thus, the time constant circuit 53 was made large enough so that black information remaining during vertical blanking does not charge the capacitor 57 higher than the typical peak voltages developed at the collector of the transistor 35 by black picture information in the video information signal. Thus, the vertical pulse signals and the black portion of the video information signal have a major influence on the potential developed at the charge capacitor 57.

As a result of this feedback action, the black information of the "picture" portion of the video signal is set and held to approximately the same voltage as the DC level or threshold level of the transistor 35 established by the adjustable DC potential source. Moreover, this DC potential may be a fixed value with a black level adjustment located elsewhere in the circuitry. Moreover, the unblanked portion of the vertical blanking signal serves to limit the detector and prevent the detector from pulling a nearly white scene objectionally far in the black direction.

Referring to a preferred embodiment, FIG. 2 illustrates an automatic black level setting circuit having a source of video signals 69 which includes an adjustable contrast control 71. The source of video signals 69 is coupled via a coupling capacitor 73 and isolating resistor 75 to the base of a transistor 77 of a comparator circuit means 79.

The emitter of the transistor 77 is coupled to circuit ground by a resistor 81 and to a DC source B+ by way of a series connected fixed resistor 83 and adjustable resistors 85 and 87 respectively. Thus, the adjustable DC source, B+ and resistors 85 and 87, serve to provide a selectable threshold level for the transistor 77. The collector of the transistor 77 is connected via a resistor 89 to a blanker potential source 91 normally available in a television receiver. This blanker potential source 91 provides a negative-going DC pulse signal 93 in time coincidence with the horizontal blanking portion of the video signal. Thus, the negative-going DC pulse signal 93 disables the comparator circuit 79 at the horizontal pulse interval of the video signal.

Also coupled to the collector of the transistor 77 is a detector and limiter means 95. This detector and limiter means 95 includes a diode 97 and a relatively long charge time constant circuit including a charge capacitor 99 and resistor 89. As previously mentioned, the detector and limiter means 95 tends toward an average detector which is responsive not only to black signals in the "picture" portion of the video signal which are in excess of a threshold level but also to black information remaining during the vertical blanking portion of the video signal.

In other words, the time constant of the detector and limiter means 95 is chosen such that pulse signals occurring during the vertical interval of the video signal do not alter the black signal reference level beyond the point where black signals appearing during the "picture" portion of the video signal will activate the detector. However, when the "picture" portion of the video signal contains very little black information, the vertical blanking signals act to limit the detector from reducing the black level to a point which is blacker than black and objectionable.

Additionally, noise cancellation signals available elsewhere in a television receiver may be applied via a diode 103 to the base of the transistor 77 to effect disablement thereof. Moreover, a capacitor 105 coupling the base to the emitter of the transistor 77 may be employed to roll off high frequency noise signals for additional noise protection.

As an example, but in no way limiting the invention, the following component values are appropriate to the embodiment of FIG. 2:

| | | |
|---|---|---|
| C73 | — | 5 uf |
| C99 | — | 2 uf |
| C105 | — | 100 pf |
| R-75 | — | 10 KΩ |
| R-81 | — | 220 Ω |
| R-83 | — | 1 KΩ |
| R-85 | — | 2 KΩ |
| R-87 | — | 2 KΩ |
| R-89 | — | 33 KΩ |
| -continued | | |
| R-101 | — | 10 KΩ |
| Transistor 77 | — | 2 N 3694 |
| Diode 97 | — | 1 N 914 |
| Diode 103 | — | 1 N 914 |

Thus, there has been provided a unique automatic black level setting circuit having numerous advantages over other known techniques and apparatus. The circuitry is greatly simplified as compared with any other known technique of utilizing the "picture" portion of the video signal for determining black level in a television receiver. The technique enhances the capability of the television receiver in that incorrect or faulty station adjustments are virtually eliminated.

Also, such undesirable features as drift due to DC circuitry and black shift due to varying picture level of AC coupling are no longer a problem. Further, the system provides an advantage in that scenes with little or no black information actually look better to the viewer if the greyest available information is forced toward black. Moreover, the system provides a black level setting substantially independent of a contrast control adjustment.

While there has been shown and described what is at present considered the preferred embodiment of the invention, it will be obvious to those skilled in the art that various changes and modifications may be made therein without departing from the scope of the invention as defined by the appended claims.

What is claimed is:

1. In a television receiver having a source of video signals including horizontal and vertical blanking interval signals and video information signals, a source of DC potential, and a source of circuit disablement signals corresponding to noise cancellation and said blanking interval signals, an automatic black level setting circuit comprising:
   comparator circuit means coupled to said source of video signals, to said source of DC potential, and to said source of disablement signal, said comparator means having a given threshold level determined by said source of DC potential and providing a control signal derived from said source of video signals in accordance with potentials from said source of circuit disablement potentials; and
   detector and limiter means coupling said comparator circuit means to said source of video signals, said detector and limiter means responsive to said control signal and providing a DC potential to effect automatic establishment of a black level setting at said video signal source representative of the blackest level of said video information portion of said video signal.

2. The automatically black level setting circuit of claim 1 wherein said source of circuit disablement signals is a source of intermittant DC potential providing disablement potentials to said comparator means in time coincidence with said horizontal blanking interval signals of said source of video signals.

3. The automatic black level setting circuit of claim 1 wherein said source of video signals includes noise signals and horizontal and vertical blanking interval signals and said source of circuit disablement signals provides a disablement potential to said comparator means in time coincidence with at least one of said noise, horizontal blanking interval and vertical blanking interval signals of said video signal source.

4. The automatic black level setting circuit of claim 1 wherein said source of DC potential is adjustable to provide an adjustable threshold level and an adjustable black level control for a television receiver.

5. The automatic black level setting circuit of claim 1 wherein said control signal includes video information signals and vertical blanking interval signals exceeding said threshold level determined by said DC potential source to effect automatic establishment of a black level setting at said video signal source.

6. The automatic black level setting circuit of claim 1 wherein said comparator means includes an electron device having a first input electrode coupled to said source of video signals, a second input electrode coupled to said source of DC potential, and an output electrode coupled to said source of disablement signals and to said detector and limiter means.

7. The automatic black level setting circuit of claim 1 wherein said detector and limiter means includes time constant circuitry of a value to inhibit alteration of black reference signal level by pulses occurring during the vertical blanking interval portion of the video signal beyond the point where black video information signals activate the detector and limiter means.

8. The automatic black level setting circuit of claim 1 wherein said detector and limiter means includes time constant circuitry of a value which responds to pulse signals occurring during the vertical blanking interval portion of the video signal to limit the black reference signal level in the substantial absence of black in the video information signal.

9. The automatic black level setting circuit of claim 1 wherein said detector and limiter means includes a series connected rectifier and detector means having a current gain capability.

10. The automatic black level setting circuit of claim 1 wherein said source of video signals includes a contrast control means to provide contrast controlled video signals from said video signal source.

11. The automatic black level setting circuit of claim 1 wherein said television receiver includes a source of noise cancellation signals and means coupling said source of noise cancellation signals to said comparator circuit means.

12. The automatic black level setting circuit of claim 11 wherein said means coupling said source of noise cancellation signals to said comparator means is in the form of a diode.

13. The automatic black level setting circuit of claim 11 wherein said means coupling said source of noise cancellation signals to said comparator means is in the form of a transistor.

14. An automatic black level setting circuit for a television receiver having a source of video signals including horizontal and vertical blanking interval signals and video information signals, an adjustable source of DC potential, and a source of circuit disabling signals corresponding to noise cancellation and said blanking interval signals comprising:
  comparator circuit means coupled to said adjustable source of DC potential for establishing a potential threshold level, to said source of video signals for providing a control signal in response to video signals in excess of said threshold level, and to said source of circuit disabling potentials for disablement of said comparator circuit during portions of said video signal; and
  detector and limiter means coupled to said comparator circuit means and to said source of video signals, said detector and limiter means responding to said control signal from said comparator circuit to effect establishment of a black level setting at said video signal source representative of video information signals and signals occurring during said vertical blanking interval in excess of said threshold level.

15. The automatic black level setting circuit of claim 14 wherein said comparator circuit means is in the form of an electron device having first and second input electrodes coupled to said video signal and adjustable DC potential sources respectively and an output electrode coupled to said source of circuit disabling signals and to said detector and limiter means.

16. The automatic black level setting circuit of claim 14 wherein said source of disabling signals includes sources of noise, horizontal and vertical blanking signals in time coincidence with noise, horizontal, and vertical blanking interval signals in said video signal and circuit means for coupling said sources of noise, horizontal, and vertical blanking signals to said comparator circuit means.

17. The automatic black level setting circuit of claim 14 wherein said source of disabling signals is in the form of an intermittant DC potential source providing a DC potential to said comparator circuit means and interrupted during said horizontal blanking pulse interval of said video signal.

18. The automatic black level setting circuit of claim 14 wherein said detector and limiter means is in the form of a rectifier coupled to said comparator circuit means and said source of circuit disabling signals and a time constant circuit including a charge capacitor coupling said rectifier to circuit ground and a resistor coupling said rectifier to said source of video signals.

19. The automatic black level setting circuit of claim 14 wherein said rectifier and limiter means includes a time constant circuit and is formed to provide a black level setting at said source of video signals in response to video information signals in excess of said threshold level and in the absence of video information signals in excess of said threshold level to signals occurring during said vertical blanking interval in excess of said threshold level.

20. The automatic black level setting circuit of claim 14 wherein said detector and limiter means includes a rectifier coupled to said comparator circuit means and said source of circuit disabling signals and a detector means coupling said rectifier to said source of video signals whereby said rectifier inhibits reverse conductivity of said detector means and said detector means provides a current amplification capability.

* * * * *

UNITED STATES PATENT AND TRADEMARK OFFICE
CERTIFICATE OF CORRECTION

PATENT NO. : 3,976,836
DATED : August 24, 1976
INVENTOR(S) : Robert Charles Wheeler It is certified that error appears in the above-identified patent and that said Letters Patent are hereby corrected as shown below:

Claim 14, line 10 - Please delete "potentials" and insert -- signals --.

*Signed and Sealed this*

Ninth Day of November 1976

[SEAL]

Attest:

RUTH C. MASON
*Attesting Officer*

C. MARSHALL DANN
*Commissioner of Patents and Trademarks*